United States Patent [19]

Westerman et al.

[11] Patent Number: 4,858,853
[45] Date of Patent: Aug. 22, 1989

[54] BOLTED REPAIR FOR CURVED SURFACES

[75] Inventors: Everett A. Westerman, Auburn; Mark S. Cohodas, Seattle, both of Wash.

[73] Assignee: The Boeing Company, Seattle, Wash.

[21] Appl. No.: 157,279

[22] Filed: Feb. 17, 1988

[51] Int. Cl.⁴ .................................................. B23P 7/04
[52] U.S. Cl. ..................... 244/119; 244/132; 29/402.09; 29/402.14
[58] Field of Search ................ 114/227; 244/119, 121, 244/125, 126, 129.1, 129.4, 132, 133, 131, 135 R; 29/402.09, 402.12, 402.14, 402.15, 402.19

[56] References Cited

U.S. PATENT DOCUMENTS

| | | |
|---|---|---|
| 2,692,425 | 10/1954 | Martin . |
| 2,795,523 | 6/1957 | Cobb et al. . |
| 2,819,032 | 1/1958 | Detrie et al. ........................ 244/119 |
| 3,365,097 | 1/1968 | Chase .............................. 29/402.12 |
| 4,147,576 | 4/1979 | Beem et al. ...................... 29/402.09 |
| 4,176,437 | 12/1979 | Scholz et al. . |
| 4,473,419 | 9/1984 | Hardy . |
| 4,517,038 | 5/1985 | Miller . |
| 4,531,275 | 7/1985 | Kelly .............................. 29/402.12 |
| 4,556,439 | 12/1985 | Bannink, Jr. . |
| 4,591,511 | 5/1986 | Peebles, Jr. . |
| 4,732,633 | 3/1988 | Pokorny .......................... 29/402.09 |

FOREIGN PATENT DOCUMENTS 110896 8/1980 Japan .................................. 29/402.09

Primary Examiner—Sherman D. Basinger
Assistant Examiner—Stephen P. Avila
Attorney, Agent, or Firm—Seed and Berry

[57] ABSTRACT

A bolted repair for curved surfaces of an aircraft structure includes a plurality of relatively thin, flexible plates that are bent to conform to the surface, either individually or as a group. After the plates have been bent to conform to the surface, layers of adhesive are applied between adjacent plates to bond the plates to each other. The resulting stack of bonded plates is then secured to the structure with fasteners extending through attachment holes in the stack and structure. The plates may be bent by first securing a portion of a stack of plates to the structure and then bending the stack of plates so that the plates progressively conform to the surface of the structure. As areas of the stack of plates conform to the surface of said structure, the areas are temporarily secured to the structure with temporary fasteners until the entire surface of the stack of plates has been bent to conform to the surface of the structure. After layers of adhesive are applied between adjacent plates and all of the temporary fasteners have been installed so that the entire surface of the stack of plates conforms to the surface of the structure, the temporary fasteners are sequentially removed and permanent fasteners are installed in their places.

18 Claims, 3 Drawing Sheets

BOLTED REPAIR FOR CURVED SURFACES

FIELD OF THE INVENTION

This invention relates to a method of repairing curved surfaces, and more particularly, to a method of structurally repairing holes in curved surfaces using bonded plates that conform to the contour of the surface.

BACKGROUND ART

Aircraft structures are divided into two classifications or categories, namely, primary structures and secondary structures. A primary structure is a structure that carries a load that is critical to the structural integrity of the aircraft. Primary structures include portions of the skins of the wings, fuselage and other weight-bearing surfaces. The primary structures of present aircraft are generally fabricated of metal. However, the primary structures of newer aircraft are increasingly being fabricated from composite materials. A primary structure of composite material would generally have a thickness in the range of 0.10 inch to 0.50 inch thick. A primary structure composed of metal would be somewhat thinner, but it would also generally be heavier, thus making a composite structure preferred where the weight of the aircraft is an important consideration.

A secondary structure is a structure that does not carry any load that is critical to the structural integrity of the aircraft. Secondary structures include flight control surfaces, such as flaps, ailerons and rudders, which, although critical to the flight of the aircraft, are not major load-bearing surfaces. Composite materials are being used to fabricate the secondary structures of aircraft with increasing frequency. Secondary structures of composite material generally have a thickness of about 0.10 inch.

Aircraft can be damaged through a variety of mishaps, but such damage generally involves an impact between the aircraft and another body. For example, damage may be the result of the aircraft striking a bird or hail, or a bullet or other projectile striking the aircraft. An aircraft may also be damaged during repairs if it is struck by a tool or a vehicle. Damage to the aircraft may be in either a primary structure or a secondary structure. Although damage to a secondary structure may be repaired in a nonstructural manner or, in some cases, deferred for later repair, damage to a primary structure must be repaired in a structural manner prior to any flight of the aircraft. Frequently, the damage occurs on a curved surface, such as the leading edge of a wing. To maintain the aerodynamic capabilities of the aircraft, it is important that the outer surface of the repaired structure have the same contour as before. Therefore, the repair must conform to the contour of the damaged structure.

Present methods for repairing damaged portions of curved surfaces of aircraft are expensive and time-consuming. One method presently used requires the aircraft to be returned to the service center to initiate the repair. At the service center, the contour of the aircraft structure at the damaged location is measured. A thick plate is then machined or otherwise fabricated to match the contour of the structure to be repaired, and bolted or bonded onto the structure over the damaged area. Any voids between the thick plate and the aircraft structure are filled with a sealing device. This method of repairing aircraft structures is expensive and time-consuming. The strength and thickness of the thick plate prevent it from being shaped by commonly available hand-forming machines. Instead, it can be shaped only by special machines, such as brakes and presses, at the repair facility. Further, it can be very difficult to shape the plate to conform to the damaged surface, particularly where the damage is in a composite structure, since composite structures often have compound curves.

Another technique for repairing damaged composite structures involves the use of ply-oriented, prepreg lay-up, hot-bonded panels which are remelted over the surface of a damaged composite structure. However, this technique is also time-consuming and very difficult. In fact, only highly trained technicians are able to properly complete such repairs. Finally, repairs made using this technique often do not replace all of the strength lost because of the damage. As a result, this method sometimes cannot be used to repair damage to primary structures.

DISCLOSURE OF THE INVENTION

It is an object of the invention to provide for structural repair of a curved surface which can be easily performed in the field.

It is another object of the invention to provide a structural repair which is structural in nature so that it can be used to repair primary structures.

It is another object of the invention to provide a repair patch which can conform to surfaces of an aircraft that are curved in a compound or highly irregular manner.

These and other objects of the invention are accomplished by a plurality of relatively thin, flexible plates that are bent to conform to a damaged aircraft surface either individually or as a group. The plates may be bent by first securing a portion of a stack of plates to the structure and then bending the stack of plates so that the plates progressively conform to the surface of the structure. As areas of the stack of plates conform to the surface of said structure, the areas are temporarily secured to the structure with temporary fasteners until the entire surface of the stack of plates has been bent to conform to the surface of the structure. After all of the temporary fasteners have been installed so that the entire surface of the stack of plates conforms to the surface of the structure, the temporary fasteners are sequentially removed and permanent attachment holes are drilled through the plates and structure in place of each temporary fastener. After removing the stack, adhesive is placed between adjacent plates. The stack of plates is then secured to the structure by inserting a permanent fastener through each attachment hole in the stack of plates and the structure. The plates may be secured to either the outer or inner surface of the airframe structure. If the plates are externally applied, the space between the edges of the plates and the surface of the structure is preferably filled with a sealer to provide aerodynamic fairing for the plates. If the plates are internally applied, any exposed area of damage in the structure is preferably filled with a potting material. A layer of sealant may be applied between the surface of the structure and the stack of plates.

BEST MODE FOR CARRYING OUT THE INVENTION

Figure 1:
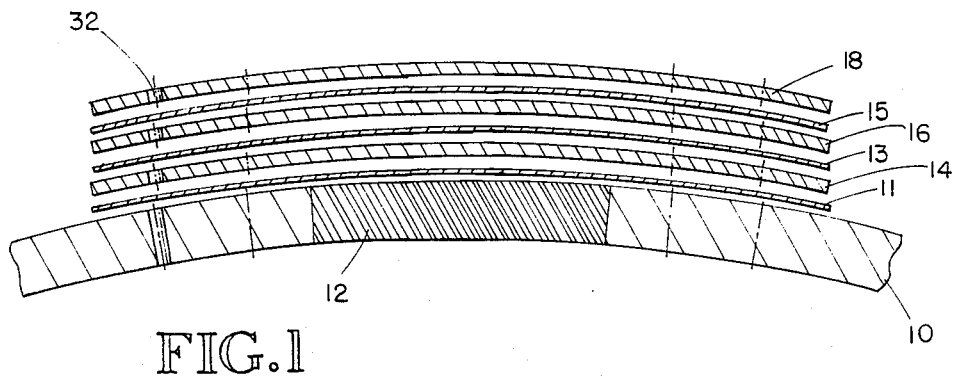
FIG. 1 is a cross-sectional, exploded view of the repair plates and structure.

A structure 10 having damaged area 12 to be repaired is shown in FIG. 1. This structure 10 may be a secondary structure of an aircraft, such as a flight control surface, in which case it is sheet metal or a composite panel and would generally be about 0.10 inch thick. The structure 10 may also be a primary structure of an aircraft, such as a wing skin or other load-bearing surface, in which case it would generally be about 0.40 inch thick. However, the primary structure may be somewhat thinner or thicker if made from different materials or for different parts of the aircraft.

As illustrated in FIG. 1, the damaged area 12 represents a hole completely through the structure 10. A small hole is in the range of 0.50 inch to 1.50 inches in diameter, with some large holes being up to 3 inches in diameter. In the example illustrated in FIG. 1, a first repair plate 14 is mounted on a layer of conventional sealant 11 that has been placed on the damaged structure 10. A second repair plate 16 is then secured over the first repair plate 14 with a layer of conventional adhesive 13. Finally, a third repair plate 18 is secured over the second repair plate 16 with another layer of conventional adhesive 15. Although the repair illustrated in FIG. 1 utilizes three repair plates 12, 14, 16, it will be understood that a greater number of plates may be used.

Figure 2:
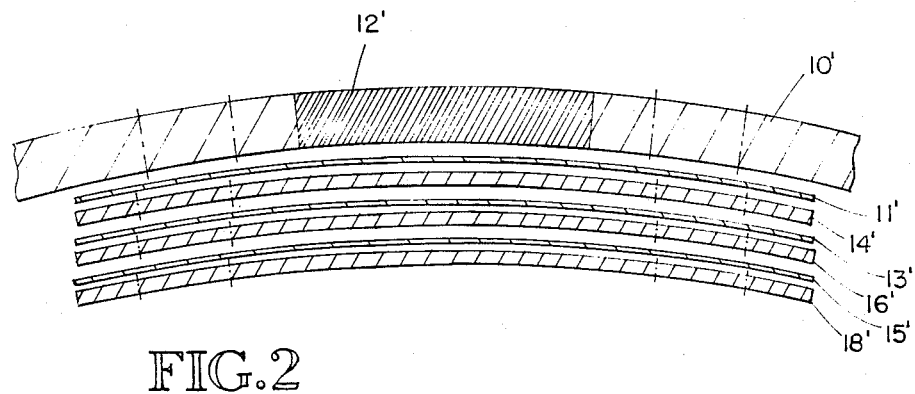
FIG. 2 is a cross-sectional, exploded view of the repair plates applied to the inner surface of the structure.

The repair illustrated in FIG. 1 is performed by securing the patch to the outer surface of the damaged area. However, the patch may also be secured to the inner surface of the damaged area, as illustrated in FIG. 2. In the event that the patch is to be applied internally, a first repair plate 14' is placed on the inside surface of the damaged structure 10 with a layer of conventional sealant 11 positioned therebetween. A second repair plate 16' is then secured over the first repair plate 14' with a layer of conventional adhesive 13'. Finally, a third repair plate 18' is secured over the second repair plate 16' with another layer of conventional adhesive 15'. Although the repair illustrated in FIG. 2 utilizes three repair plates 12', 14', 16', it will be understood that a greater number of plates may be used.

Each of the repair plates 14, 16, 18 is made of thin, stainless steel or other suitable metal. The thin repair plates, if made of stainless steel, are on the order of 0.01 inch thick. This permits the repair plates to be manually bent by the hands of the person performing the repair. Further, three, four or more repair plates may be placed together and bent as a group to conform to the structure contour. After the repair has been effected, the plurality of thin repair plates bonded to each other with adhesive become a single, thick repair plate, having the structural strength and resistance to bending of the combined plates fixed together.

The first step of the repair procedure is to trim the damaged area 12 to a shape which will prevent further cracking or tearing in the main structure 10. Trimming the damaged area 12 to a circular hole has been found to be advantageous. The number of plates needed to provide the required strength is then determined. As a general rule, the repair plates, when placed together, have a thickness approximately the same as the thickness of structure 10. Therefore, if the structure 10 is 0.10 inch, then approximately eight to ten repair plates are used to provide a stack of repair plates 26, approximately 0.08 to 0.10 inch. For thinner members, a fewer number of plates, such as three or four, may be used. Similarly, for a primary structure, which is often 0.40 inch in thickness, thirty to forty plates may be used to effect the repair. The number of plates which must be used is that number which is required to restore the full structural strength to the structure 10 to replace that load-bearing capability lost by the removal of structure from damaged area 12, and will vary with their thickness and the type of metal used to provide the required strength.

After the number of required plates has been determined, the repair plates are cut to the appropriate diameter to effect the repair of the damaged area. For a 1.0 inch diameter hole, the repair plates are approximately 4.0 inches in diameter.

Figure 5:
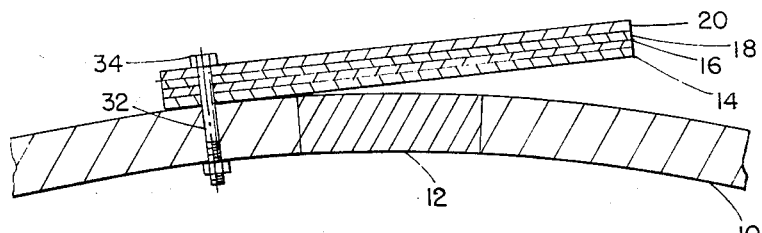
FIG. 5 is a cross-sectional view of repair plates being bent to conform to the damaged surface in an early stage of the repair.

The repair plates are next positioned over the damaged area and bent to conform to the contour of the structure 10 to which they will be affixed. If only a few plates are used, it may be possible to shape all of the plates as a unit. However, if a large number of plates are used, it may be necessary to hand-shape the plates to the contour of the structure individually or, in smaller groups. This continues until each of the plates accurately conforms to the exact shape of the contour which they overlie, whether it be the structure itself or another plate.

Where multiple plates are bent at the same time, the plates may be bent using the procedure illustrated in FIGS. 5-8. With reference now to FIG. 5, a first hole 32 is drilled through four plates 14, 16, 18, 20 and the damaged structure 10. The hole 32 serves as a pilot hole for a subsequently drilled final hole, and it is thus somewhat smaller in diameter than the final hole, through which a permanent fastener is placed. A temporary fastener 34 is then placed through the hole 32. When the temporary fastener 34 is securely fixed in position holding the plates 14-20 in position on the structure 10, the plates are bent to conform to the contour of the damaged structure 10.

Figure 6:
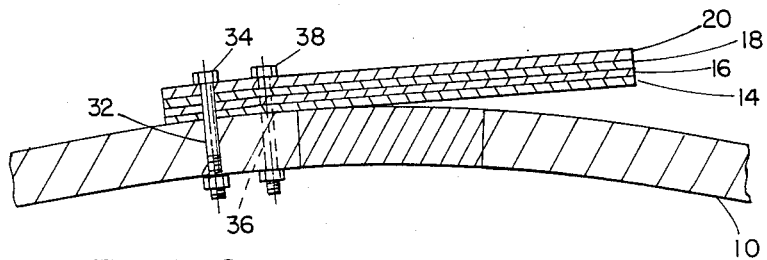
FIG. 6 is a cross-sectional view of repair plates being bent to conform to the damaged surface in a later stage of the repair.
Figure 7:
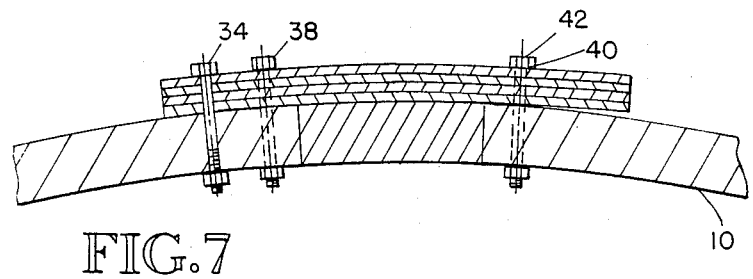
FIG. 7 is a cross-sectional view of repair plates being bent to conform to the damaged surface in a still later stage of the repair.

After the plates 14-20 have been bent for a short distance, a second hole 36 is drilled through the plates and the structure 10, and a temporary fastener 38 is placed therethrough, as illustrated in FIG. 6. An additional portion of the thin plates 14-20 is then bent and shaped by hand to conform to the surface contour of the damaged structure 10. As illustrated in FIG. 7, another hole 40 is drilled through the plates 14-20 and damaged structure further along the plates 14-20. A fastener 42 is then inserted into the hole 40 to secure the plates 14-20 to the damaged structure.

Figure 8:
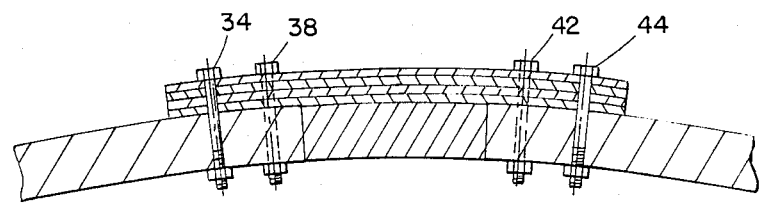
FIG. 8 is a cross-sectional view of repair plates after they have been bent to conform to the damaged surface.

The drilling of pilot holes through the plates 14–20 and structure 10 and affixing the plates 14–20 with temporary fasteners continue until the entire surface of the stack of repair plates is solidly attached to the structure, with the plates conforming to the surface of the damaged structure, as illustrated in FIG. 8. As shown in FIG. 8, the temporary fastening procedure is completed by the installation of a fourth temporary fastener 44, but larger plates 14–20 will require greater numbers of fasteners.

The patterns used to drill the holes and affix the fasteners will vary depending on the structure and its contour. The pattern of drilling the holes and affixing the fasteners is chosen for each particular contour to ensure smooth and complete conformance of the plates to the contour of the surface 10 and to ensure that the fasteners are capable of transmitting the load applied through the plates. A pattern should be chosen to avoid or minimize any wrinkling of the thin metal sheets or any puckers between the structure 10 and the repair plates or between the repair plates themselves. This pattern will be different for each repair which is effected. An advantage is achieved by securely fixing the plates to the structure with a first fastener 34 and then bending the plates to conform to the contour of the structure. This permits more accurate shaping of the thin repair plates to the exact contour of the structure 10 to be repaired. After each temporary fastener is placed into the structure, it may be necessary to reshape the thin plates to ensure that they smoothly and exactly align with the contour of the surface.

After the temporary fasteners 34, 38, 42, 44 are securely tightened to solidly fix the stacked repair plates to the structure, the structure is checked to ensure that there are no voids throughout. The fasteners 34, 38, 42 and 44 are then removed from the structure 10 and plates 14–20 one at a time. After each temporary fastener is removed, the stack of plates is removed from the structure 10. A layer of sealant 11 is then placed on the structure 10 and the first repair plate 14 is placed over the sealant 11, as explained above with reference to FIGS. 1 and 2. The sealant 11 provides corrosion resistance and a vapor barrier between the plate 14 and the structure 10. In the event stainless steel is used on composite material, the sealant may be left off, if desired, as contact corrosion between these two materials is very low. However, if stainless steel on aluminum or aluminum on graphite composite structure is used, different sealants or corrosion-resistant coatings may be desirable to retard corrosion between the structures.

Each of the remaining plates is then installed with an epoxy or other suitable adhesive material applied between adjacent plates, as also explained above with reference to FIGS. 1 and 2. The repair plates may then be bolted as a unit to the damaged structure 10 using temporary fasteners extending through the plates and the structure to be repaired.

The temporary fasteners are then removed one at a time, and the pilot hole in which the temporary fastener was installed is drilled out to a larger diameter hole in which a permanent fastener will be installed. The number of fasteners and their locations will vary according to the size of the damaged area, type of structure, and type of material used to effect the repair and location of the damaged area. As each temporary fastener 34, 38, 42, 44 is removed and its pilot hole drilled to a larger diameter, a permanent fastener is installed in its place. Thus the permanent fasteners replace the temporary fasteners one at a time.

Although the above-described procedure is described as drilling the holes for the permanent fasteners after the adhesive is applied between the plates, the holes can be drilled in the plates at any time. If the holes are drilled in the plates before the adhesive is applied between the plates, it is desirable to place a shim between the plates to simulate the thickness of the adhesive. The use of a shim will ensure that the holes will be aligned when the adhesive is placed between the plates. If the plates are bent individually or in groups without being temporarily fastened to the structure, the permanent holes can be drilled either before or after the adhesive is applied between the plates. If the holes are drilled before the adhesive is applied, a shim should be placed between the plates as described above so that the holes will be aligned after the adhesive is applied.

Other modifications of the above-described procedure will also be apparent. For example, although the plates are shown conforming to a surface that has a simple curvature, the plates can also be made to conform to a surface having a compound curvature if the plates have some elasticity or if some buckling of the plates can be tolerated. Finally, although the procedure is described as using stainless steel plates to repair a composite structure, the plates may be made of many materials, including composites. Also, the structure being repaired can be aluminum composite or any other material.

The inventive repair technique ensures that any load applied from the structure 10 to the repair plates is carried by bolts. Sufficient margins between the individual bolt holes and the bolts and the edge of the repair plates must be provided to retain transfer of the load and restore strength to the structure.

Figure 3:
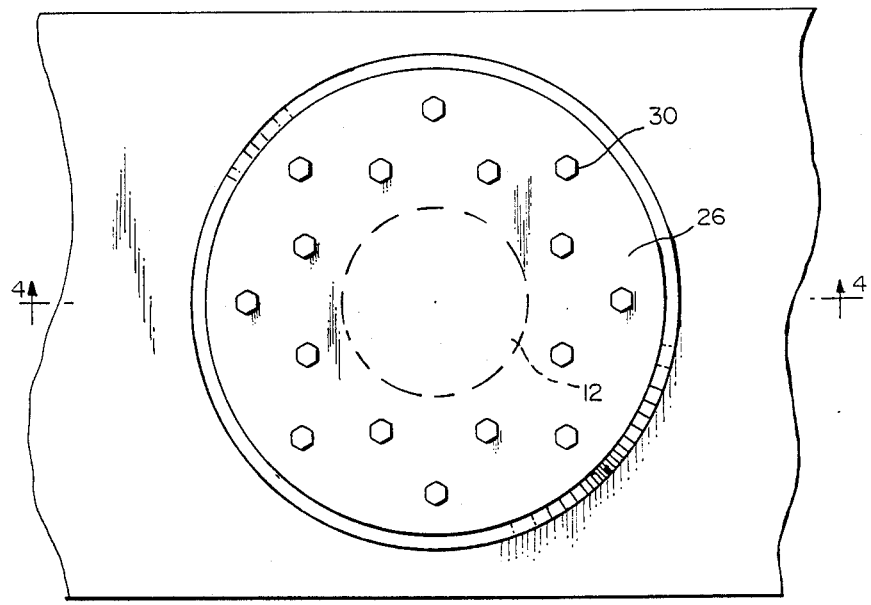
FIG. 3 is a top plan view of the repaired structure.
Figure 4:
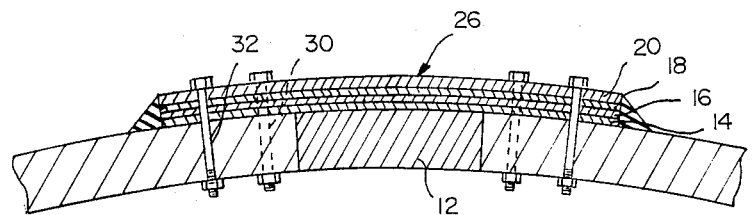
FIG. 4 is a cross-sectional view taken along the line 4—4 of FIG. 3.

The completed repair is illustrated in FIGS. 3 and 4. In the event that the repair plates 14–20 are applied externally, a conventional sealer is placed along the edges of the plates 14–20 to the surface of the structure 10 to provide aerodynamic fairing, thereby minimizing aerodynamic drag. If the plates 14–20 are applied internally, the exposed hole 12 may be filled with a suitable sealer or filling compound.

It is thus seen that the inventive repair technique allows rapid field repair of curved structures by relatively unskilled manpower. Further, the repair is structural in nature so that it can be used to repair primary airframe structures, and the strength of the repair can be adjusted at will, depending upon the strength required.

We claim:

1. A method of repairing a damaged airframe structure, comprising:
   preparing a plurality of relatively thin plates having a shape configured to at least overlap the damaged area of said structure;
   bending said plates against said structure, either individually or in groups, so that said plates progressively conform to the surface of said structure;
   applying a layer of adhesive between adjacent plates to form a stack of bonded plates; and
   securing said stack of plates to said structure by inserting permanent fasteners through respective attachment holes in said stack of plates and said structure, said stack of plates providing structural support to said airframe structure.

2. The method of claim 1 wherein said plates are secured to the outer surface of said airframe structure and wherein said method further includes filling the space between the edges of said plates and the surface of said structure with a sealer to provide aerodynamic fairing for said plates.

3. The method of claim 1 wherein said plates are secured to the inner surface of said airframe structure.

4. The method of claim 3, further including the step of filling any exposed area of damage in said structure with a filling material after said plates have been secured to the inner surface of said structure.

5. The method of claim 1, further including the step of applying a layer of sealant to the surface of said structure prior to securing said stack of plates to said structure so that said sealant spaces said plates away from the surface of said structure.

6. The method of claim 1 wherein said step of bending said plates comprises:
   stacking a plurality of said plates prior to bending;
   temporarily securing one edge of said stack of plates to said structure with a temporary fastener; and
   bending said plates against said structure so that said plates progressively conform to the surface of said structure away from said temporary fastener, and, as areas of said stack of plates conform to the surface of said structure, temporarily securing said areas of said stack to said structure with temporary fasteners until the entire surface of said stack of plates has been bent to conform to the surface of said structure.

7. The method of claim 1 wherein the plates in said stack are bent individually or in groups constituting less than the total number of plates in said stack.

8. The method of claim 1 wherein said attachment holes are drilled in said plates prior to applying said layer of adhesive between adjacent plates, said method further including the step of placing a shim between adjacent plates while said attachment holes are being drilled, said shims having a thickness that is substantially equal to the thickness of said layer of adhesive so that said attachment holes will be in alignment when said layer of adhesive is subsequently applied between said plates.

9. The method according to claim 1 further including the steps of:
   drilling a first hole through said plates and said structure at a first location;
   securing said repair plates to said structure at said first location with a fastener extending through said plates and said structure;
   bending said plates to conform to said surface;
   drilling a second hole through said plates and said structure at a second location;
   securing said repair plates to said structure at said second location with a fastener extending through said plates and said structure;
   bending said repair plates to conform to said surface;
   drilling a third hole through said plates and said structure at a third location; and
   securing said repair plates to said structure at a third location with a fastener extending through said plates and said structure.

10. The method according to claim 1 wherein said individual plates are sufficiently flexible as to be bendable by hand and said stack of bonded plates is sufficiently rigid as to not be bendable by hand.

11. A repair patch for damaged aircraft structures, comprising a plurality of relatively thin, relatively flexible plates arranged in a stack and secured to each other with layers of adhesive applied between adjacent plates, said stack conforming to the surface of said structure and being secured thereto by a plurality of fasteners extending through said plates and said structure, said individual plates being sufficiently flexible that they are bendable by hand and said stack being sufficiently strong and rigid that it is not bendable by hand, said patch being a load-bearing structure providing structural strength to said damaged aircraft structure.

12. The repair patch of claim 11 wherein said plates are secured to the outer surface of said aircraft structure.

13. The repair patch of claim 11 wherein said plates are secured to the inner surface of said airframe structure.

14. The repair patch of claim 13, further including filling material occupying any exposed damage in said structure.

15. The repair patch of claim 11, further including a layer of sealant positioned between said plates and said structure.

16. The repair patch according to claim 11 wherein said stack includes in excess of ten plates.

17. A method of repairing a damaged structure comprising:
   providing a plurality of repair plates, said plates being sufficiently thin as to be bendable by hand;
   placing a shim between respective plates, said shim having a thickness approximately equal to an adhesive layer to be later placed between said plates;
   bending said plates to conform to the shape of said structure, either individually or in groups, so that said plates conform to the surface of said structure;
   drilling a hole through said plates and said structure with said shim being between said plates;
   removing said shim from between said plates;
   applying a layer of adhesive between said plates to rigidly couple said plates to each other to form a uniting structure not bendable by hand; and
   securing said plates to said structure by inserting permanent fasteners through said plates and said structure.

18. The method according to claim 17 further including the steps of:
   drilling a first hole through said plates and said structure at a first location;
   securing said repair plates to said structure at said first location with a fastener extending through said plates and said structure;
   bending said plates to conform to said surface;
   drilling a second hole through said plates and said structure at a second location;
   securing said repair plates to said structure at said second location with a fastener extending through said plates and said structure;
   bending said repair plates to conform to said surface;
   drilling a third hole through said plates and said structure at a third location; and
   securing said repair plates to said structure at a third location with a fastener extending through said plates and said structure.

* * * * *